Figure 1:
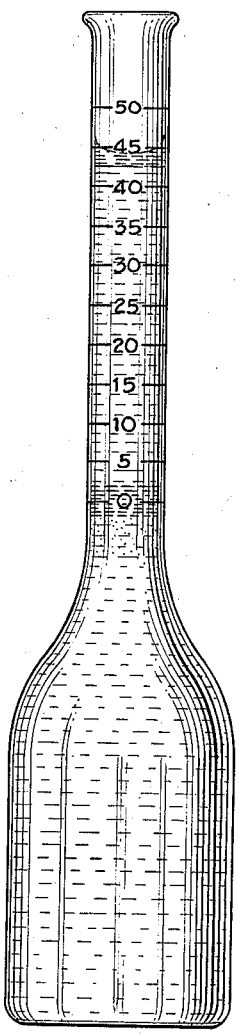

Sept. 6, 1938.  R. E. WOOD  2,129,516

PROCESS OF DETERMINING BUTTERFAT IN CREAM

Filed Oct. 4, 1933

INVENTOR.
RONALD WOOD
BY
ATTORNEYS.

Patented Sept. 6, 1938

2,129,516

UNITED STATES PATENT OFFICE 2,129,516

PROCESS OF DETERMINING BUTTERFAT IN CREAM

Ronald E. Wood, Moscow, Idaho

Application October 4, 1933, Serial No. 692,516

4 Claims. (Cl. 23—231)

My present invention relates to a butterfat clarifying solution and process of using the solution, as applied to an analytical method (Babcock method) of testing cream, milk, and other dairy products for the purpose of estimating the volume of determining the quantity of butterfat in the cream or milk. In carrying out my invention I employ a clarifying solution having a specific gravity greater than that of the butterfat, and lower than the acid which is employed for changing the non-fat solids into solution. This acid may be sulphuric acid in a concentrated form, or in the form as diluted in the well known Babcock analytical method.

In the well known Babcock analytical method or process as now generally practised, the volumetric estimation of fat in the cream or milk is found by first accurately weighing, as a sample, say nine grams of the cream into a test tube, to which is added a sufficient quantity of sulphuric acid as will convert into solution all of the non-fat solids of the sample. The mixing of the acid with the water of the cream generates heat which converts the butterfat into liquid form. The sample tube and its contents are then whirled in a centrifugal machine which causes the fat to rise in the tube and up into the graduated, testing, neck portion of the test bottle or test tube. A red reader, or oil colored red, as glymol, which is lighter than the butterfat, is poured into the neck of the bottle or tube on top of the fat column for the purpose of destroying the meniscus on top of the column before the reading is made.

With the use of a pair of dividers, the length of the fat column is ascertained. One point of the dividers is set at zero, and wherever the other point touches the graduation on the neck of the test bottle, such graduation indicates the percentage of butterfat present in the sample of cream.

In actual practice, however, the Babcock process or method of volumetric estimation is not an exact one, for the reason varying conditions are encountered; for instance, if the temperature of the cream, the temperature and the quantity and strength of sulphuric acid are not exactly correct, as is frequently the case, there will appear in and around the base of the butterfat column, charred or undissolved particles of non-fat solids. The presence of these particles erroneously increases the length of the fat column, and they obscure and prevent a definite line of demarcation at the base of the column, with the result that the test is frequently a guess, and under such conditions the creamery operators and producers suffer loss.

In the practice of my method in combination with the Babcock, or any other similar analytical process, the result attained is a definite line of demarcation at the bottom of the fat column between the foreign substances, the clarifying solution, and the butterfat, by means of which the true and exact amount of butterfat may be estimated. Thus the analytical test with my invention may be made with the assurance that mistakes cannot be made that are due to incompetence, carelessness, and varying conditions out of control of the operator.

In the accompanying drawing I have illustrated one embodiment of my invention, but it will be understood that changes and alterations may be made in the application of the process or method without departing from the principles of my invention.

Figure 2:
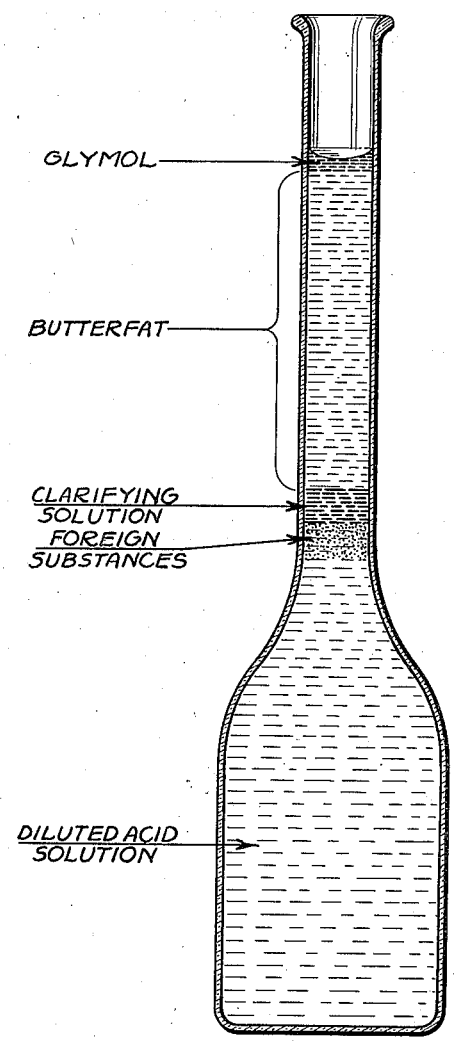

Figure 1 is a conventional type of bottle or tube, as employed in the well known Babcock method of testing dairy products, and Figure 2 shows the bottle or tube as it is employed in carrying out my additional analytical process, the bottle being shown in section.

In carrying out my invention I provide a clarifying solution or "reader", which is preferably red in color, and which contains any suitable combination of chemicals or substances, which, when added to a Babcock test of dairy products, will traverse and clarify the butterfat column, and become stationary between the lower end of the column and the diluted acid solution below the column. Due to the relative specific gravity of the butterfat in the column, that of the "reader" or clarifying solution, and that of the foreign substances below the "reader" the clarifying solution forms a stationary and definite dividing element between the butterfat and the foreign substances.

The clarifying solution, in the present instance, comprises ethyl alcohol and distilled water in the proportions of 40% alcohol and 60% water, with a coloring matter (preferably red) added to the water to render the solution clearly visible, as a reader, in the neck of the test bottle or tube. The specific gravity of this solution is greater than that of the pure butterfat, and less than that of the chemically pure sulphuric acid employed in the analytical process. Thus, when the clarifying solution, as a step in the process or method of testing, is introduced to the sample in the test tube, the clarifying solution in its passage down through the column in the neck of the tube presses down and carries with it all foreign substances, as charred solids not fats and curd, and the clarifying solution holds these foreign substances below it at the bottom of the butterfat column as indicated in Figure 2.

In the Babcock test, after the sulphuric acid is added to the cream in the test tube and thoroughly mixed, to convert the non-fat solids into solution, the sample tube and its contents are placed in a centrifugal machine and the tube is whirled by the machine to raise the liquid butterfat up into the graduated neck of the test bottle by periodic addition of water, and further centrifuging.

After the tests are completed by the Babcock method and the sample is still in the centrifugal machine, two to three-tenths of a cubic centimeter, or approximately about one quarter of an inch, in depth, of the clarifying solution, is added on top of the sample or the column of butter-fat in the neck of the tube. The tube is again whirled by action of the centrifugal machine, at the regular speed, for not more than one minute or a sufficient period of time to pass the clarifying solution completely through the fat column, after which the tube is removed from the machine and placed in a water bath for say three or five minutes at between 130° and 140° F.

The analytical estimate may then be made, and it is found that the contents of the tube appear as indicated in Figure 2 of the drawing with the foreign substances above the diluted acid solution, the clarifying solution or red reader standing out distinctly between the foreign substances and the column of butterfat, and the length of the butterfat column distinctly defined by the clarifying solution below and the glymol above.

Thus the column of butterfat is cleared of all undesired substances which would otherwise interfere with a correct estimate and would obscure the line of demarcation at the bottom of the column. The solution is not harmful to, nor does it affiliate with the butterfat, neither does the solution absorb any portion of the butterfat, but on the other hand the passage of the solution down through the sample in the neck of the tube clarifies the butterfat of all foreign and undesired substances.

Having thus fully described my invention, what I claim as new and desire to secure by Letters Patent is:

1. The steps in the process of determining the butterfat content of cream which consists in adding sulphuric acid to the cream thereby converting non-fat solids into liquids, adding a colored fat insoluble solution having a specific gravity greater than the butterfat and less than the sulphuric acid to form a reader between the butterfat and the sulphuric acid, and adding a colored upper reader having a specific gravity less than the butterfat, whereby the butterfat meniscus is displaced and the two readers sharply define the column of butterfat for reading.

2. The steps in the process of determining the butterfat content in cream which consist in adding sulphuric acid to the cream thereby converting the non-fat solids into liquids, adding colored ethyl alcohol having a specific gravity greater than the butterfat and less than the sulphuric acid to form a lower reader between the butterfat and the sulphuric acid, and adding glymol to form an upper reader having a specific gravity less than the butterfat, whereby the butterfat meniscus is displaced and the two readers sharply define the column of butterfat for reading.

3. The steps in the process of determining the butterfat content of cream which consists in adding to the cream a sufficient amount of an acid solvent for the non-fat solids to convert these non-fat solids to liquids, causing the separation of the fat and water portions of the mixture into discrete layers, the upper layer containing the butterfat content and the lower layer containing the water and water soluble content of the mixture, adding a colored fat insoluble liquid having a specific gravity greater than the butterfat layer but less than the water layer to form a reader between the two layers, and adding a colored fat insoluble upper reader having a specific gravity less than the butterfat, whereby the butterfat meniscus is displaced and the two readers sharply define the column of butterfat for reading.

4. The process of claim 3 wherein the colored fat insoluble liquid having a specific gravity greater than the butterfat layer but less than the water layer consists of a colored solution of ethyl alcohol in water in such proportions as to yield the proper specific gravity.

RONALD E. WOOD.